United States Patent
Remelman (10) Patent No.: US 7,546,198 B2
(45) Date of Patent: Jun. 9, 2009

(54) DYNAMIC NOISE-REDUCTION BASELINING FOR REAL-TIME SPECTRAL ANALYSIS OF INTERNAL COMBUSTION ENGINE KNOCK

(75) Inventor: George Mark Remelman, Fremont, CA (US)

(73) Assignee: Spectral Dynamics, Inc., San Jose, CA (US)

( * ) Notice: Subject to any disclaimer, the term of this patent is extended or adjusted under 35 U.S.C. 154(b) by 96 days.

(21) Appl. No.: 11/881,908

(22) Filed: Jul. 30, 2007

(65) Prior Publication Data

US 2008/0033629 A1 Feb. 7, 2008

Related U.S. Application Data

(60) Provisional application No. 60/835,561, filed on Aug. 3, 2006.

(51) Int. Cl.
- *G06F 19/00* (2006.01)
- *F02P 5/152* (2006.01)
- *G01L 7/00* (2006.01)
- *G06F 11/30* (2006.01)
- *G01M 15/00* (2006.01)

(52) U.S. Cl. ............ 701/111; 123/406.21; 123/406.33; 701/115; 702/54; 702/182; 73/114.02

(58) Field of Classification Search ............ 123/406.21, 123/406.27, 406.29, 406.33; 701/101–103, 701/110, 111, 114, 115; 73/35.01, 35.04, 73/35.07–35.12, 114.02–114.11, 114.16–114.21; 702/54, 182, 183

See application file for complete search history.

(56) References Cited

U.S. PATENT DOCUMENTS

| | | | |
|---|---|---|---|
| 4,471,736 A | 9/1984 | Yoshida | 123/406.21 |
| 4,598,681 A * | 7/1986 | Hayashi | 123/406.4 |
| 5,109,821 A | 5/1992 | Yoshida et al. | 123/406.15 |
| 5,215,059 A | 6/1993 | Kaneyasu | 123/406.27 |
| 5,230,238 A * | 7/1993 | Takeuchi | 73/35.11 |
| 6,131,465 A * | 10/2000 | Wlodarczyk et al. | 73/35.07 |
| 6,505,504 B1 * | 1/2003 | Chang et al. | 73/114.15 |
| 6,701,775 B1 * | 3/2004 | Popielas et al. | 73/114.06 |

(Continued)

FOREIGN PATENT DOCUMENTS

WO      WO 2008000568 A1 *  1/2008    ............ 123/406.29

OTHER PUBLICATIONS

Collins, "Engine Knock Analyzer" Raeburn Technology, 4 pp. 1994.

(Continued)

*Primary Examiner*—Willis R Wolfe, Jr.
(74) *Attorney, Agent, or Firm*—Jon M. Dickinson, PC; Robert D. Varitz, PC (57) ABSTRACT

A real-time, dynamic method for creating a body of cycle-and-cylinder-specific noise-reduction baseline data useable in conjunction with analyzing the engine-knock behavior of a subject internal combustion engine involving operating the engine in an operating mode wherein engine knock may occur, and while doing so, and during each cycle of each cylinder, gathering cycle-and-cylinder-specific, knock-free, engine-operating, baseline noise data which is intended and dedicated for noise-reduction use solely with respect to analyzing any knock data found to exist in the same operating cycle.

14 Claims, 5 Drawing Sheets

U.S. PATENT DOCUMENTS

| | | | |
|---|---|---|---|
| 7,181,339 B2* | 2/2007 | Remelman | 701/111 |
| 7,280,988 B2* | 10/2007 | Helsper et al. | 702/182 |
| 7,415,347 B2* | 8/2008 | Naber et al. | 701/111 |
| 2006/0169244 A1* | 8/2006 | Allen | 123/406.43 |

OTHER PUBLICATIONS

Daniels et al., "Inaudible Knock and Partial-Burn Detection Using In-Cylinder Ionization Signal" SAE Technical Paper Series, 2003-01-3149, Powertrain & Fluid Systems Conference & Exhibition, Pittsburg, PA Jan. 2003. 9 pp.

Hollowell et al.,"A Close Look at the Measurement of Shock Data—Lessons Learned—" 13$^{th}$ Aerospace Testing Seminar, IES Journal, 1992, 8 pp.

"Hitachi Accelerates the Development of Engine Knock-Reduction Systems" www.mathworks.com, User Story, Jan. 2005, 2 pp.

"Engine Knock Detection Using Spectral Analysis Techniques With a TMS320 DSP", Texas Instruments, Digital Signal Processing Products, 1995. 1 p., (Cover page only w/ internet link provided).

* cited by examiner

Fig. 13

DYNAMIC NOISE-REDUCTION BASELINING FOR REAL-TIME SPECTRAL ANALYSIS OF INTERNAL COMBUSTION ENGINE KNOCK

CROSS REFERENCE TO RELATED APPLICATION

This application claims priority to U.S. Provisional Patent Application Ser. No. 60/835,561, filed Aug. 3, 2006, for "Real-Time Spectral Analysis of Internal Combustion Engine Knock Utilizing Dynamic Baselining Noise Reduction". The entire disclosure content of that prior-filed, currently co-pending provisional application is hereby incorporated herein by reference.

BACKGROUND AND SUMMARY OF THE INVENTION

Engine knock is a behavior wherein the normally controlled burn activity of an internal combustion engine is perturbed by premature ignition of the fuel/air mixture. There are many causes of knock, and it is very important to eliminate the possibility of excessive knock of any type so as to prevent serious damage to an engine, and loss of significant engine power and operating efficiency.

Despite advances heretofore in the science of addressing the issue of engine knock issue, the "gold standard" for real-time knock detection involves the bolting of a copper tube to the block of an engine for the purpose of permitting a trained technician to listen, via the tube, for audible sounds believed to be interpretable as knock. This very subjective and error-prone method is, of course, often quite unacceptable, and accordingly, there have been many efforts in recent years directed toward developing more sophisticated techniques for assessing internal combustion engine knock.

Recognizing that there have been many "science side" (rather then "art side") proposals and advancements for detecting and analyzing engine knock, the engine-knock analysis system disclosed herein employing the features—dynamic noise-reduction baselining features—of the present invention nevertheless offers a significant and unique advance in the ability to accomplish precision, noise-suppressed analyzable knock detection, and to do so very rapidly, very accurately, and on-the-fly, so-to-speak, during real-time engine operation.

In a manner of thinking about the practice proposed by the present invention, that practice is based upon having access, effectively, to a body of carefully engine-noise-reduced, frequency-domain-spectral, engine-operating, energy-content data derived from an operating engine—data of a kind which is expected to contain, in one or more experientially pre-selected, knock-related frequency bands (referred to herein as spectral bins), evidence of any engine-knock behavior. Such access, enhanced by the methodology of the present invention, leads toward the step of comparing, ultimately, and via a predecessor practice referred to as bin-summing, the sum total of noise-reduced spectral energy reflected in those selected spectral bins with a pre-determined, user-chosen spectral energy threshold value deemed to be indicative of transition of an engine cylinder into a confirmable engine-knock behavior condition. The finding of a noise-reduced spectral energy value which exceeds this spectral energy threshold produces herein a positive declaration of the presence of engine knock. The practice of bin-summing, discussed very summarily later herein, which is not, per se, any part of the present invention, is described fully in a predecessor, companion, background U.S. Patent which is U.S. Pat. No. 7,181,339 B2, issued Feb. 20, 2007, for "Real-Time Spectral Analysis of Internal Combustion Engine Knock". The full disclosure content of that patent is hereby incorporated herein by reference.

This currently presented system, which employs the present invention as disclosed herein, is an enhanced version of the predecessor system described in the '339 patent, and specifically a version which is significantly enhanced in relation to a real-time manner of developing important noise-reduction baseline data.

In the mentioned predecessor system, a method and a system are described for gathering data from an operating internal combustion engine enabling the easy and accurate determination of engine-knock behavior. The present invention, as was just above stated, involves an improvement in the real-time practice of that prior-disclosed system—an improvement in the sense of a hereinbelow described, new and unique practice (referred to as dynamic baselining) for acquiring dynamic, noise-reduction baseline data to be used in the determination of a baseline noise-reduction index value which can then be employed to remove knock-information-obscuring engine noise from relevant, acquired engine-operating data so as better to detect, and clearly identify and analyze, an engine-knock condition.

In accordance with this prior-existing (predecessor) system disclosure, baseline noise-reduction data is derived in a pre-engine-testing-condition mode of operation, wherein an engine that is to be tested for engine-knock behavior is specifically operated initially in a non-normal operating mode wherein, with a very high degree of certainty, no engine-knock condition will exhibit. It is clear from the description given regarding this prior-disclosed system and practice that baseline, or baselining, data is acquired under circumstances which are created before an engine is put into a real-time test mode for the purpose of detecting engine knock.

There are many circumstances, however, including circumstances involving engines that have relatively short operating lifetimes between required maintenance activities, with respect to which it is important, if possible, not to use up valuable engine operating time in such a pre-operation mode, simply for the purpose of detecting baseline noise data (i.e., baseline noise-reduction data). Put another way, the present invention recognizes the importance of avoiding "eating into" an engine-operating lifecycle between maintenance events by uniquely utilizing a baseline data-collection technique which can function during what is otherwise normal engine operation.

Fundamentally, and in accordance with practice of the present invention, and during a full test procedure (i.e., not within a pre-test situation), referred to herein as a test span, cylinder pressure data is employed (preferably) to identify, during pre-compression and pre-ignition cyclic periods associated with a selected, monitored cylinder, a crank-angle window wherein an operating engine will most likely operate in a behavior-region wherein any engine noise detected will most confidently be non-knock engine noise.

As a momentary informational aside at this point, a test-span begins with initial engine operation, and ends when a knock event is detected in the behavior of a cylinder.

In accordance with the invention, and with respect to observations made of internal, operating-engine cylinder pressure under these full-test conditions, a baseline, or baselining, window is defined—an action referred to also as windowing, as window-defining, as window identification, and as crank-angle windowing—with beginning and ending crank angles in relation to a suitably discerned peak cylinder pressure value. This window is deemed to be a window during which no engine knock behavior is expected. As will be seen, this baselining window immediately precedes a linked crank-angle range selected for monitoring because of the high likelihood of detecting evidence of cylinder knock behavior during that linked range. The scope or extent of this linked crank-angle range is predetermined on the basis of expert knowledge about the expected performance of an engine being tested. Collectively, the baseline window range and the so-called linked range are referred to herein as a crank-angle monitoring range.

Crank-angle window-defining for a monitored cylinder may be performed either (a) once-only, as during a first (or early) operating cycle within an engine test span, to be employed as the operative baselining window in relation to all subsequent operating cycles during that test span, or (b) independently during each operating cycle for employment only in relation to that cycle.

Thus, whereas in the prior practice described in the above-referenced, predecessor U.S. Patent, collection, or derivation, of baseline noise-reduction data takes place in a circumstance wherein an engine is forced entirely into a special, predictable non-knock condition in a pre-test-span operation, according to the present invention, such baseline data is obtained as a body during conditions of normal knock-possible engine operation by looking at selected crank-angle portions of cylinder operating cycles wherein knock is deemed to be unlikely to occur—i.e., in the determined crank-angle baselining window.

While there may be many different ways in which signal-processing selection—also referred to herein as calculation—of an appropriate window for the collection of baseline data may be performed, two which have been found to be very useful include: (a) a practice (Mode I) wherein high-frequency filtering is applied to acquire, relative to crank-angle status, cylinder-pressure data to detect steep angles of pressure change (leading to sharp pressure peaks) so as to indicate the onset of an event which should not be included in baseline data; and (b) a practice (Mode II) wherein an initial window is suitably established (as by implementation once of the Mode I practice just described), and thereafter cylinder peak pressures are monitored from cycle-to-cycle to determine whether or not there are any significant jumps in the crank-angle positions of steep-angle cylinder-pressure changes which indicate the possible need to change, and/or shift, the crank-angle baselining window boundaries. In both approaches, which relate to certain peak-pressure information, a baselining window is established to reside in a range of crank angles that precede a crank angle at which a sharp pressure rise is detected, and it is in this selected crank-angle window that baseline data is acquired during each cycle.

These two signal-processing windowing practices, in relation to their respective details of implementation as signal-processing modalities, are specifically and generally conventional in nature, are well understood by those skilled in the relevant art, do not form any part of the present invention, and therefore are not set forth in any greater detail herein.

Following such cylinder-specific baselining window identification (depending upon which of the two just-mentioned modes of windowing is employed), and thereafter during each engine full-test operating cycle, cylinder-specific data relating to engine noise is gathered during the relevant window, and is used, "on the fly", to create baseline noise-reduction data which will be applied to later-in-the-associated-cycle, acquired data from which engine-knock behavior may be detected.

Thus, practice of the present invention involves a cycle-by-cycle determination of baseline data derived during such a window, with a particular baseline noise-reduction index value therefore developed for each cycle of operation, and with all of this being done during "full-bore" engine-operational testing in a test span.

Reiterating what has just been described, in accordance with the present invention, during the acquisition and ultimate use of such dynamically acquired baseline data, a subject engine operates in a full, normal mode of operation wherein knock may occur (or may be induced to occur). In each operating cycle of a cylinder selected for monitoring, and following the mentioned, windowed period of pre-compression time during which baseline noise-reduction data is acquired, as the selected engine cylinder advances directly into a combustion portion of its cycle, data continues to be acquired during the entire crank-angle monitoring range relating to cylinder pressure conditions, and is treated, cycle-by-cycle, with the just-detected baseline noise data to remove that noise data, and to expose any engine-knock behavior which has occurred during that cycle.

From what has just been generally outlined above regarding the baseline windowing and baseline-data noise-reduction employment practices of the present invention, it should be evident that there are up to two, different cooperative "levels"—single and dual—of dynamic baselining performance offered by the present invention. Single-level dynamic baselining involves single-stage, multiple-cycle-use, crank-angle windowing, with cycle-specific noise-reduction baselining data being derived from a fixed-boundaried baselining window, and then employed cycle-specifically within each and every relevant-cylinder operating cycle. Dual-level dynamic baselining adds to single-level baselining the practice of cycle-specific, plural-stage crank-angle windowing.

In the detailed description of the invention presented herein, and in order to place the invention in an appropriate operational context, the nature and features of the invention are described in the full setting of a representative engine-knock spectral analysis. Much of this descriptive setting is drawn from the text that is contained in the above-referred-to U.S. Patent, abbreviated where elaboration is not required specifically in the present text, with the suggestion given for the reader to consult the earlier text in that prior patent for a fuller exposition of subject matter not relevant to the understanding, per se, of the present invention.

Accordingly, the important features and advantages which are offered by the present invention will shortly become more fully apparent as the detailed description thereof which follows below is read in conjunction with the accompanying several drawings.

DESCRIPTION OF THE DRAWINGS

FIG. 1 is high-level, schematic illustration of a system designed to implement the unique dynamic baselining methodology of the present invention. This illustration specifically relates to a practice of assessing the knock behavior of a subject engine under controlled circumstances where the engine is connected to an otherwise conventional dynamometer, typically at a point in the design history of that engine where its engineers are seeking to specify and effect any needed engine, or engine controller program, modifications in order thereafter to "release" an engine and controller for production which will not be subject to damaging, or otherwise unacceptable, knock behavior.

FIGS. 11 and 12 are furnished herein principally to provide an illustration, generally, that certain types of useful graphical displays may be presented to an operator for viewing during an engine-knock analysis procedure.

FIG. 13 is presented with the intention that it will be readable from two, different points of view. From one point of view, it pertains to the establishment of a baseline noise-reduction index value (mentioned earlier herein). From this point of view, it relates specifically to baseline data acquired during a baseline window in a cylinder operating cycle. From the other point of view, it relates specifically to engine-operating data drawn from the same cylinder cycle associated with the first-mentioned point of view, but based upon only that data relating to the crank-angle "balance" of that cycle which extends positively from beyond the baseline window to the end of the associated crank-angle monitoring range.

DETAILED DESCRIPTION OF THE INVENTION

Figure 1:
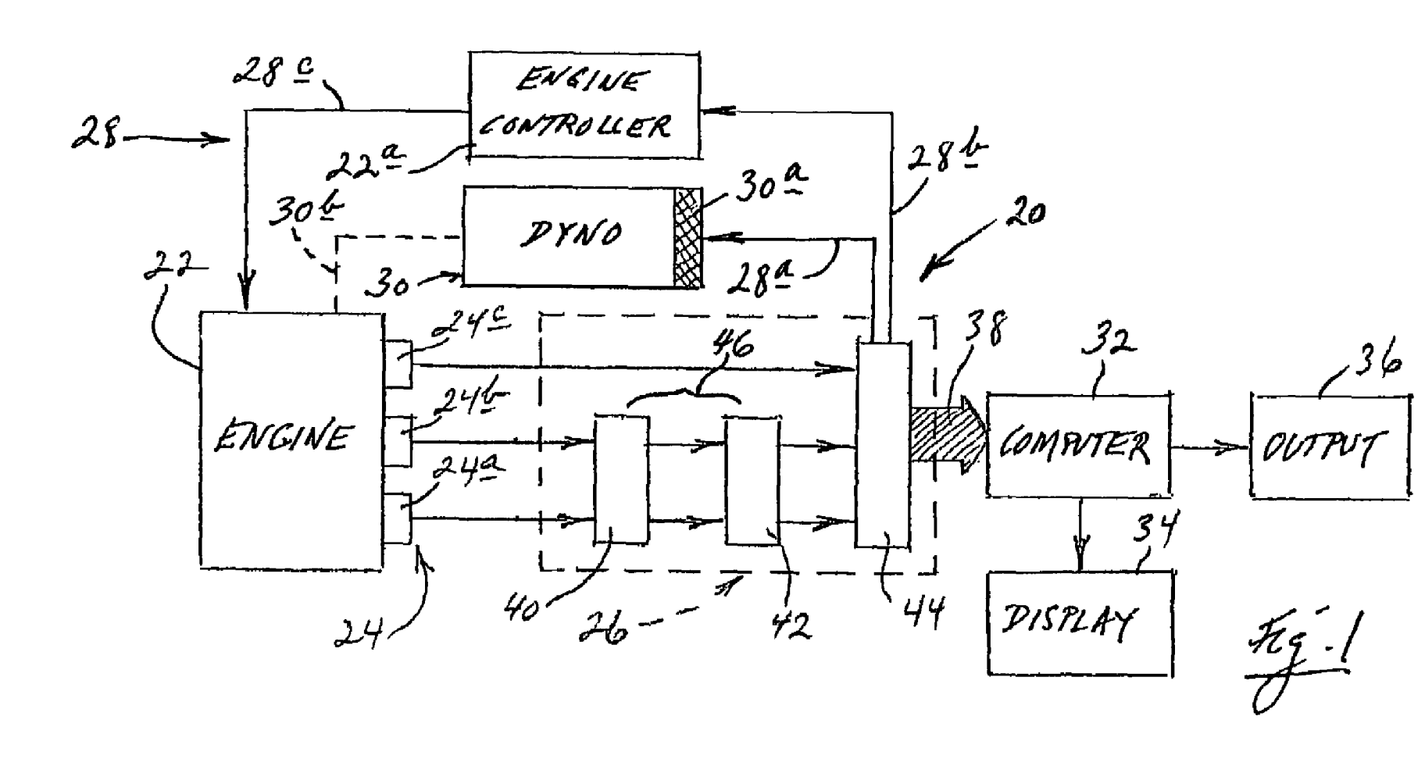

Turning now to the drawings, and referring first of all to FIG. 1, indicated generally at 20 is a real-time system for acquiring and presenting, for analytical use, from a subject internal combustion engine 22, engine-knock data. As will be more fully explained shortly, system 20 implements the dynamic baselining methodology of the present invention in one of its several forms.

Included in system 20, and appropriately operatively coupled to engine 22, which has an engine controller 22a, are (a) transducer structure 24, which includes at least one (for at least one selected cylinder) cylinder-pressure sensor 24a, an acoustic sensor 24b, and an engine crank-angle sensor 24c, (b) a portion 26 of signal-processing structure, and (c) an interconnection structure 28. In FIG. 1, interconnection structure 28 includes a conventional dynamometer system (Dyno) 30 which has the usual signal-responsive, electronic controller 30a. Dyno 30 is mechanically coupled to engine 22 in a conventional manner via a connection shown in dashed lines at 30b.

Also seen in FIG. 1, and represented, respectively, by blocks 32, 34, 36, are a computer, which also forms part of the previously mentioned signal-processing structure, a display, such as a computer monitor, which is appropriately coupled to the computer, and output structure which provides appropriate, knock-information output data in the context of a knock-behavior analysis of engine 22. Computer 32 is coupled to structure 26 through a conventional bus connection shown generally at 38. Display 34 may be used to present graphical, engine-analysis images like those shown in FIGS. 11 and 12.

Figure 3:
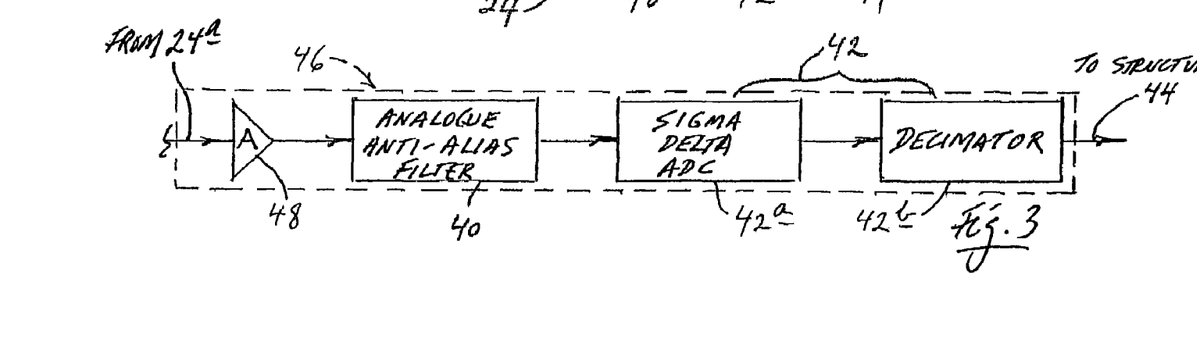
FIG. 3 is a fragmentary, block/schematic diagram illustrating, generally, analogue anti-aliasing, and subsequent sampling and digital Nyquist filtering, of direct-from-engine-cylinder input data which is acquired in real time from an operating engine cylinder for the purpose of conducting an analysis of engine knock in that cylinder.

Making reference now to FIG. 3 in the drawings along with FIG. 1, included within structure 26, and represented therein by several blocks, are, respectively, an analogue, anti-alias filter structure 40, a combined, Sigma-Delta, analogue-to-digital converter (ADC) structure (42a) and decimator structure (42b), collectively marked 42 (see the bracket in FIG. 3), and an output bus structure 44 (see FIG. 1). A bracket 46 shown in FIG. 1 helps to relate the bracketed structure in this figure to what appears in dashed-line block 46 in FIG. 3. As can be seen in FIG. 3, the content embraced by bracket 46 in FIG. 1 includes an analog input amplifier 48 which is connected in a cascade fashion with just-mentioned filter structure 40, Sigma-Delta (ADC) structure 42a, and decimator structure 42b.

It should be understood that what is shown in FIG. 3 relates, in operation and performance, specifically to cascade signal-processing flow through structure 26 from cylinder-pressure sensor 24a to bus structure 44. Substantially the same cascade arrangement exists in and through structure 26 between acoustic sensor 24b and bus structure 44. For all practical purposes with respect to the practice of the dynamic baselining methodology of the present invention, crank-angle-reference signals (pulses) acquired conventionally via crank-angle sensor 24c flow through structure 26 substantially directly to bus structure 44.

A conventional control-signal output made available by and from bus structure 44 supplies control signals through a signal-coupling path 28a in interconnection structure 28 directly to dynamometer controller 30a. Another control-signal output from bus structure 44 is connected by a connection 28b to engine controller 22a. The usual operative connection between engine controller 22a and engine 22 is shown at 28c.

Figure 2:
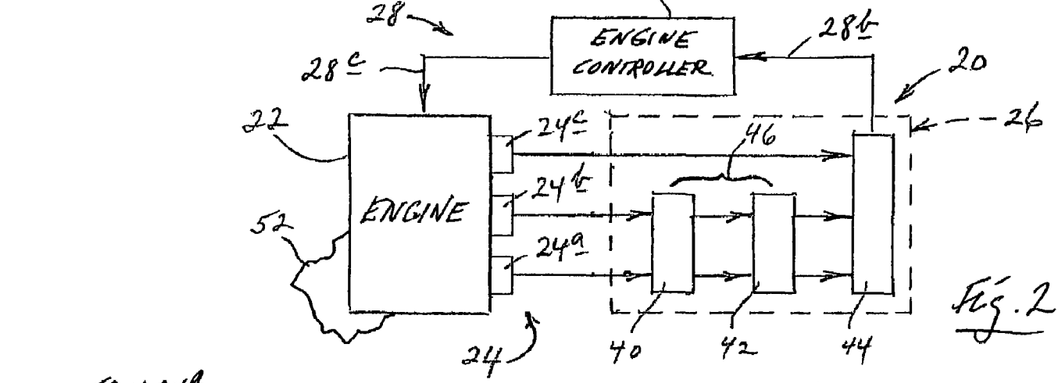
FIG. 2 is a high-level, block/schematic diagram illustrating a modified form of a system which practices the methodology of the present invention in the setting of an already-constructed vehicle, wherein detection of knock behavior can be employed, via a conventional, electronic engine controller, to make engine operating adjustments on-the-fly if engine-knock behavior begins to show itself.

Before continuing with more description relating to FIGS. 1 and 3, and directing attention for a moment to FIG. 2, here, engine 22 is shown, schematically, installed in a vehicle which is pictured only fragmentarily at 52. The relevant control output of bus structure 44 is, as in FIG. 1, connected to engine controller 22a via previously mentioned connection 28b. In the invention embodiment illustrated in FIG. 2, it is expected that engine controller 22a will have the appropriate structure to perform the functions carried out in the embodiment shown in FIG. 1 by computer 32. If, however, this turns out not to be the case, an appropriate computer structure may be inserted in the control path existing between bus structure 44 and engine controller 22a. The insertion of such computer structure is something which will be well understood by those generally skilled in the relevant art, and accordingly is not further discussed herein.

The dynamic baselining methodology of the present invention functions in the setting of FIG. 2 in essentially the same manner that it functions in the setting of FIG. 1. Accordingly, the description of the invention presented hereinbelow in the context of the system shown in FIG. 1 is directly applicable to the "in vehicle" context of FIG. 2.

While various different kinds of readily available signal-processing and handling structures may be employed to make up the contents of structure 26 herein, one arrangement which has been found to work extremely satisfactorily takes the form of a combination of a multi-channel data-acquisition module made by Spectral Dynamics in San Jose, Calif., sold as VXI model VX2905, and any appropriate data output bus which makes up previously mentioned bus structure 44. Signals coming from crank-angle sensor 24c, which may take the form of a conventional rotary encoder capable of producing both index and clock pulses, are suitably coupled to an available digital input provided in structure 26 (and in VXI model VX2905). Analog signals arriving from cylinder-pressure sensor 24a, and from acoustic sensor 24b, are fed into structure 26 through appropriate analog inputs, following which, such signals are carefully analogue anti-alias filtered (block 40), Sigma-Delta analog-to-digital converted (block 42a), and decimated (block 42b) before flowing to bus structure 44. The combined performances of the two substructures (42a, 42b) which make up block 42 collectively implement sampling, digitizing and Nyquist filtering of the received, anti-alias-filtered signals. Nyquist filtering is preferably performed at a sampling rate which is no less than about 125-kHz.

With respect to sensors 24a, 24b, these are preferably entirely conventional devices which produce analogue signals respectively associated with the events which they are intended to monitor. Different types of cylinder-pressure sensors may be employed, such as a head-pressure sensor, and a spark-plug sensor.

It should further be understood that practice of the present invention, while now being described in conjunction with cylinder-pressure (engine/cylinder operating) signals collected from a single, selected engine cylinder, is preferably performed with cylinder-pressure sensing taking place for all engine cylinders. Such plural-cylinder pressure-sensing is readily accommodated by an appropriate, plural-channel device disposed at the location of structure 26. The VXI device model mentioned above is entirely suitable for this purpose.

For knock-assessment purposes, while engine-operating acoustic data is quite useful for additional, knock-presence "confirmation" reasons, knock data having the greatest relevance, in relation to companion crank-angle data, will most likely appear in the cylinder-operational cylinder-pressure data acquired from cylinders in an operating engine. Accordingly, the following system-operation and invention-practice descriptions are given in terms of the acquisition and processing of such pressure data.

Figure 4:
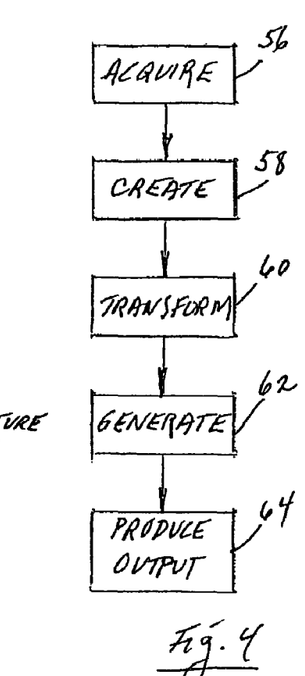
FIG. 4 is a high-level, block/schematic diagram illustrating one way of viewing engine-knock analysis as performed by the system of FIG. 1, employing the dynamic baselining practice of the present invention.

Continuing now with general explanatory references made to the additional drawing figures, and previewing in broadbrush terms the operational landscape of system 20, FIG. 4 illustrates, in five blocks, 56, 58, 60, 62, 64, an overall view of the operation of system 20. These blocks are labeled, respectively, ACQUIRE, CREATE, TRANSFORM, GENERATE and PRODUCE OUTPUT.

In this five-main-step expression of system-20 operation, during each monitored cycle of a selected cylinder's operation, analogue cylinder-pressure data and related cylinder crank-angle pulse data are acquired. From the acquired analogue data, and with baseline windowing and crank-angle monitoring range established, two bodies of cylinder-pressure data are effectively created—one relating to baseline noise-reduction data, and the other to post-baseline window data relevant to the balance portion of the effective crank-angle monitoring range. This body-created analogue data is anti-aliased, sampled, digitized, Nyquist-filtered, and Fast-Fourier transformed to generate frequency-bin-relevant spectral energy plots, one for each data body, like the plot shown in FIG. 13 (still to be further discussed).

From energy information contained in the chosen frequency bins, calculations are performed involving cycle-specific baseline noise reduction, and threshold value comparing, as briefly outlined above, to assess, on a cycle-by-cycle basis, the presence or absence of knock in a given cylinder operating cycle. These calculations produce an appropriate indicative output of knock-assessment information.

Figure 5:
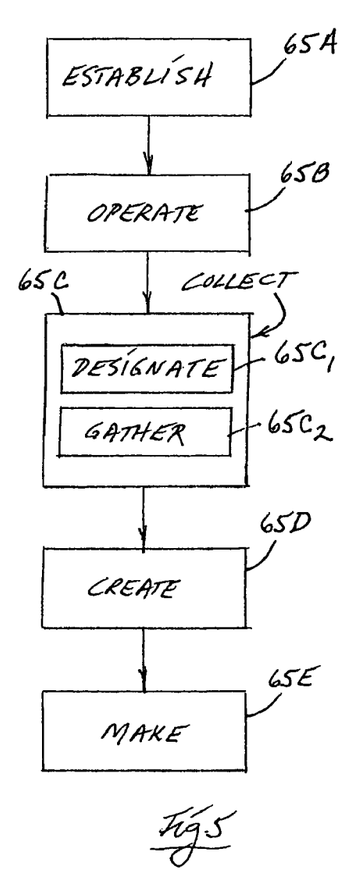
FIGS. 5 and 6 provide two, different, block-diagram step illustrations of the dynamic baselining practice of the present invention.

FIG. 5 presents, in five blocks 65A, 65B, 65C, 65D, 65E, and in two sub-blocks $65C_1$ and $65C_2$, one way of visualizing and understanding specifically the dynamic baselining practice of the present invention. The mentioned five blocks in this figure are labeled ESTABLISH, OPERATE, COLLECT, CREATE and MAKE. The two mentioned sub-blocks are labeled DESIGNATE and GATHER. More will shortly be said about how these several blocks and sub-blocks describe one point of view of the present invention.

Figure 6:
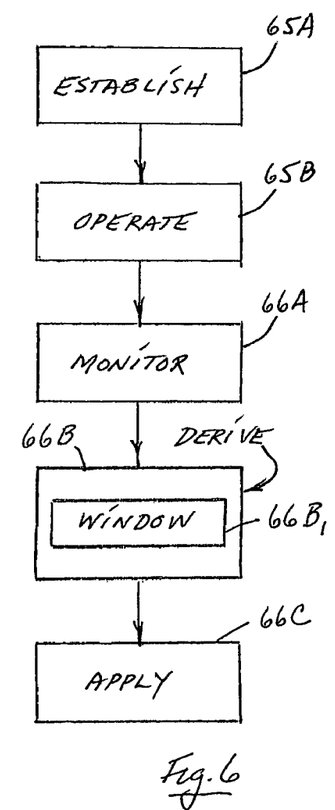

FIG. 6 includes five blocks 65A, 65B, 66A, 66B, and 66C, labeled, respectively, ESTABLISH, OPERATE, MONITOR, DERIVE, and APPLY, which furnish yet another way of viewing and understanding the dynamic baselining noise-reduction practice proposed by the present invention. FIG. 6 also includes a single sub-block $66B_1$, labeled WINDOW, which forms a portion of block 66B. This FIG. 6 manner of viewing the methodology of the invention will also be described shortly.

Figure 7:
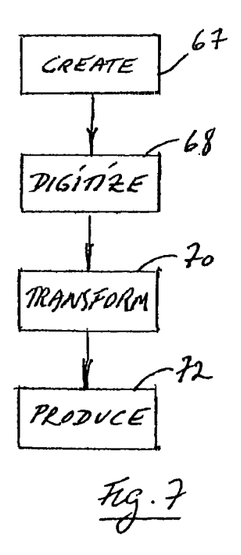
FIG. 7 is a high-level, block/schematic diagram describing, from the initial creation of a cycle-specific body of analogue noise-reduction data, the production of a related body, or collection, of baseline, frequency-domain, spectral, noise-reduction data which is employed, ultimately and directly, to minimize the likelihood that spurious noise events will become confused with, and characterized as, true engine-knock behavior. Portions of this figure, for drawing-economy purposes, are also employed herein to describe processing to produce, from a created body of cycle-specific, analogue input data which specifically is potential knock-information-containing, per-cycle data, a spectral, frequency-domain collection of data respecting which noise-reduction will take place to assess the presence or absence of engine knock.

FIG. 7 illustrates, in four blocks, 67, 68, 70, 72, which are generally labeled CREATE, DIGITIZE, TRANSFORM and PRODUCE, the two, different aspects of the operation of system 20 mentioned above in the description of the drawings.

Figure 8:
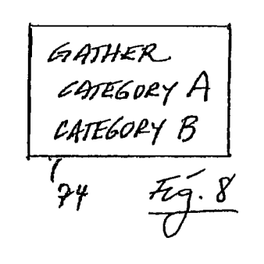
FIG. 8 is a single diagram block illustrating, very generally, the gathering of two categories of knock-assessment-relevant data from an operating engine cylinder as part of an overall procedure for implementing engine-knock analysis.

FIG. 8 illustrates, in a single block 74, specifically what is performed in terms of data-gathering illustrated in FIG. 4 by block 56. Analogue data coming in from sensors 24a, 24b is referred to herein as Category A data. Pulse, crank-angle data arriving from sensor 24c is referred to as Category B data.

Figure 9:
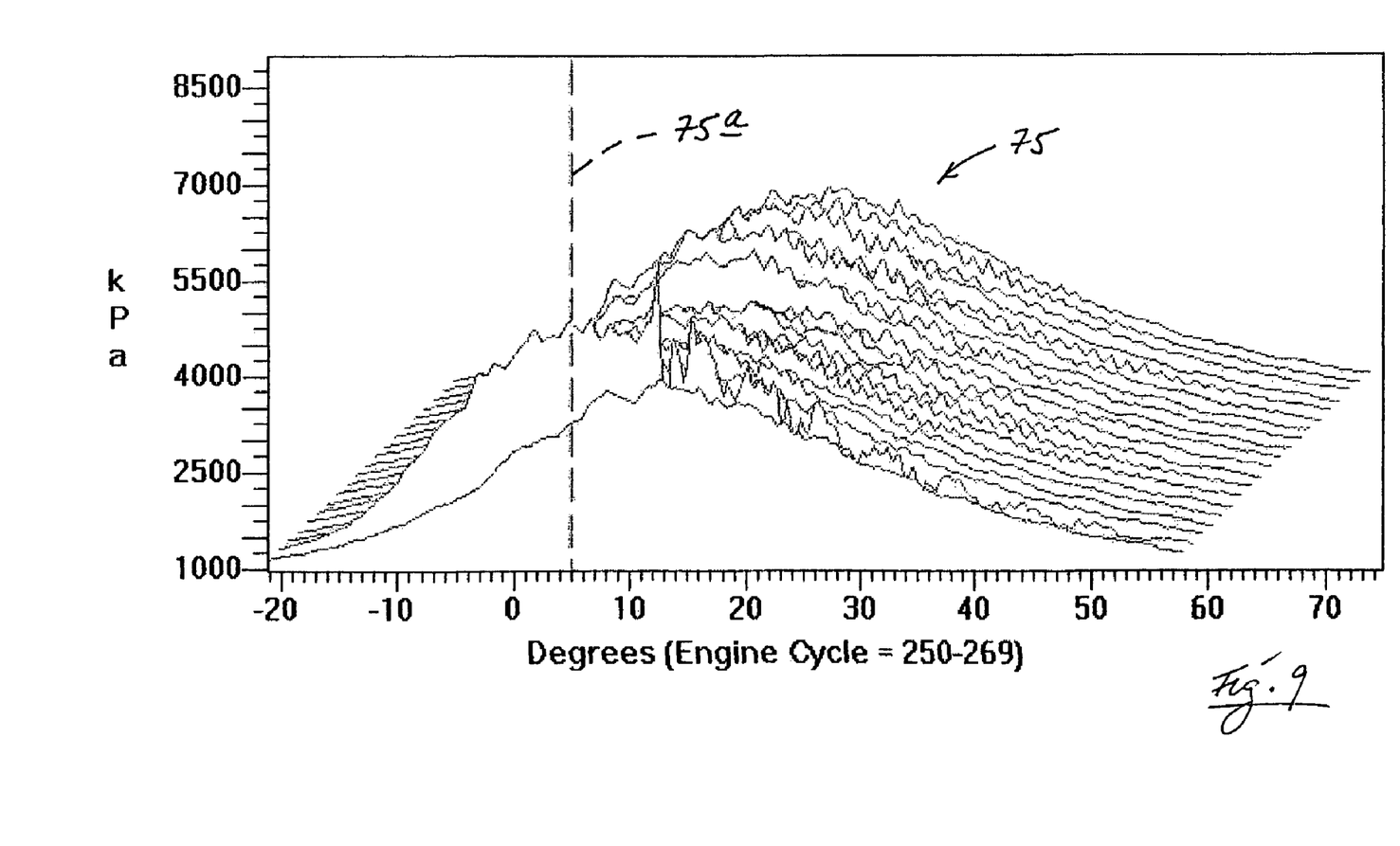
FIG. 9 is a waterfall-type display representing a particular collection of successive, single-selected-cylinder, engine-operating cycles, useful in describing, and for visualizing, the dynamic baselining windowing practice of the present invention. This display specifically shows those two, relevant portions of these cycles which collectively and generally span a range of crank angles referred to herein as a crank-angle monitoring range (as illustrated herein from about −20° to about +60° of crank angle relative to "top dead center").

FIG. 9 shows at 75 a waterfall display which is helpful in illustrating a portion of the dynamic baselining practice of the present invention. FIG. 9 specifically shows the crank-angle range referred to herein as the crank-angle monitoring range. A dashed-line cursor 75a marks a division in this overall range between a selected baselining window which appears to the left of the cursor in this figure, and a "balance" of the range to the right of the cursor wherein engine knock data may appear.

Figure 10:
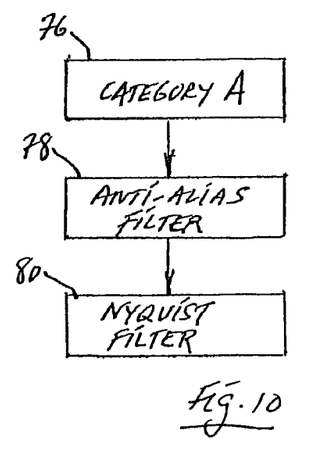
FIG. 10 is a high-level, block illustration of conventional steps involving anti-aliasing, and sampling and Nyquist filtering, of one of the two categories of data identified in FIG. 8.

FIG. 10, employing three blocks, 76, 78, 80, labeled, respectively, CATEGORY A, ANTI-ALIAS FILTER and NYQUIST FILTER, illustrates a practice in system 20 involving high-level anti-aliasing, sampling, digitizing and Nyquist-filtering, en route to bus structure 44, of originally incoming analog (Category A) data arriving at structure 26 from sensors 24a, 24b.

With reference now more specifically to the operation of system 20 in relation to what is shown in FIGS. 4-10, as was mentioned earlier herein, FIG. 4 provides a broad overview of the operation of system 20 during an engine-knock analysis procedure, which procedure includes, of course, practice of the dynamic baselining methodology of the present invention. Detailed descriptions of several ways of expressing this methodology will follow a discussion of whole-system operation during an engine-knock analysis. Completely at the option of the party conducting the analysis, certain preliminary decisions/determinations are made and put into place.

To begin with, an internal combustion engine which is to be analyzed for knock behavior is chosen. No initial designation of an engine-operating test span is required inasmuch as such a span will begin with initial running of the engine, and will end when, in any cylinder, a knock event occurs and is detected. An engine-operating modality is selected to be one wherein, if any engine-knock behavior is expected to occur at all, it will occur, or can be made to occur, in such an operating mode, at least during certain portions of each cylinder operating cycle. The operating modality may also include a pre-selection of engine operating speed, or speeds, which is/are to be employed during the test span, including planned-upon transient speed changes that will help to analyze engine-knock behavior under transient-load operational conditions (a significant capability made possible by the present invention).

Figure 13:
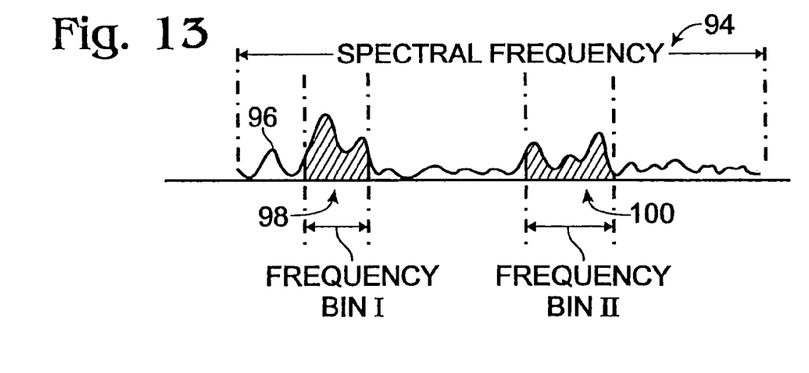
FIG. 13 is a stylized, single-cylinder, single-cycle, frequency-domain spectral diagram illustrating partially the above-referred-to practice of bin-summing of the spectral energy "contained" in two, pre-selected, spectral frequency bins which are specifically relatable, per expert pre-determination, to the likelihood of finding evidence of engine-knock behavior in such bins.

Engineers, or others, who are familiar with a particular, selected, subject engine, such as engine 22, will, by familiarity with the historical development of that engine, have a good understanding, in relation to various engine-operational speeds, of the specific range of crank angles associated with cylinders wherein engine-knock behavior is most likely to occur. These same people will also have a relatively good preliminary idea, for pre-selection purposes, about the frequency range or ranges (the previously mentioned frequency bin or bins), wherein engine-operating data may be expected to contain detectible evidence of engine-knock behavior. These determinations will be used to establish the earlier-mentioned crank-angle monitoring range, as well as the boundaries of the frequency-domain spectrum, appropriate for deriving noise-reduction knock information in the expected, relevant frequency bins. FIG. 13 in the drawings relates specifically to this important consideration.

Additionally, and based upon experience, someone involved in conducting a knock-analysis procedure will specify a threshold energy value which will ultimately be used, as generally described earlier, to determine whether or not a knock event has occurred in a cylinder-specific operating cycle.

Briefly describing how this threshold value plays a knock-measuring role, at the end of each cylinder-specific operating cycle during an engine-operating test span, spectral energy contained in the spectral frequency bin, or bins, in a frequency-domain spectral plot representing baseline noise data (one way of viewing FIG. 13) will be summed to create the earlier mentioned noise-reduction index value. So also summed, in relation to the same operating cycle, will be the spectral energy contained in the same spectral frequency bin, or bins, in a frequency-domain spectral plot representing cylinder-operating data acquired during the post-baselining-window portions of the relevant crank-angle monitoring range (the other way of viewing FIG. 13). This bin-summing action will produce another index value—an energy value—which relates to cylinder behavior during the balance portion of the relevant crank-angle monitoring range. With this "other" index value calculated, the baseline noise-reduction index value is subtracted from it to yield a difference value. The resulting difference value is compared then with the predetermined threshold value, and if larger than the threshold value, is treated as a confirmed indication that an engine-knock event has occurred.

Another preliminary determination involves deciding which one of the two, above-described windowing modalities (I or II) will be employed to establish the boundaries of a crank-angle baselining window, i.e. the window which will define, in each cylinder operating cycle, a crank-angle span of operation during which dynamic baselining data-gathering will take place. For the purpose of further system-operation description herein, baseline windowing will be presented as taking place in the form of the first-described, Mode I windowing approach.

Looking now, as appropriate, at FIGS. 4-8, inclusive, and 10 in the drawings, engine 22 is started and operated to initiate a test span, and is placed in a selected mode of knock-possible operation as was outlined above. No pre-test engine operation takes place. In other words, as distinguished from the operation described in the above-referred-to U.S. Patent, there is no pre-test operational mode implemented for engine 22.

With the engine so operating, then, from the several sensors mentioned earlier herein, and speaking just in terms of a particular, selected, single engine cylinder, each cycle of that monitored cylinder is "observed" (block 66A) during the test span, and specifically is observed within the monitoring crank-angle range (from about −20° to about +60° of crank angle), as pictured in FIG. 9.

As was mentioned earlier, a test span ends on the occurrence of a first-observed knock event taking place in a cylinder. A person conducting the knock analysis will typically "hunt" for a knock event through the making of various changes, individually or collectively, in engine operating parameters, such as engine speed, transient engine-speed changes, engine load, "spark advancement", and so on.

In association with each cycle of operation of a monitoring-selected cylinder, cylinder-compression analogue data (Category A data) is acquired/collected/gathered (blocks 56, 65C, 74) during the monitoring crank-angle range. Also collected/gathered (block 74) during each such cycle is related crank-angle status data (Category B data).

As the Category A data comes in for monitoring, baseline windowing is performed by the Mode I windowing modality, and as a consequence of such windowing, this gathered Category A data is effectively treated/created, as represented by blocks 58, 65D, 67, on a per-cycle basis, to be viewed as including two, different collections of analogue data. One of these collections is that which lies within the cycle-established baseline window (see the region shown to the left of cursor 75a in FIG. 9), and the other collection is that which may contain evidence of knock activity, and which lies between the upper baseline crank-angle window boundary (see cursor 75a in FIG. 9) and the 60° (or so) upper crank-angle boundary marker regarding the earlier-mentioned monitoring crank-angle range.

The mentioned, created two collections of analogue data are now similarly processed, though separately treated in order to recognize that they "perform" different functions. From the standpoint of similarity, this single-cycle analogue data, in both collections, is anti-alias filtered (block 78), appropriately sampled, digitized and Nyquist filtered (blocks 68, 80), and Fast-Fourier transformed (blocks 60, 70) into spectral frequency-domain form to produce respective spectral frequency-domain plots, like the plot shown at 96 in FIG. 13. In FIG. 13, reference numeral 94 represents a span of frequencies appropriately broad enough to include the two, previously mentioned, designated spectral bins which are illustrated as boundary-marked bins 98, 100 in FIG. 13.

Figures 11, 12:
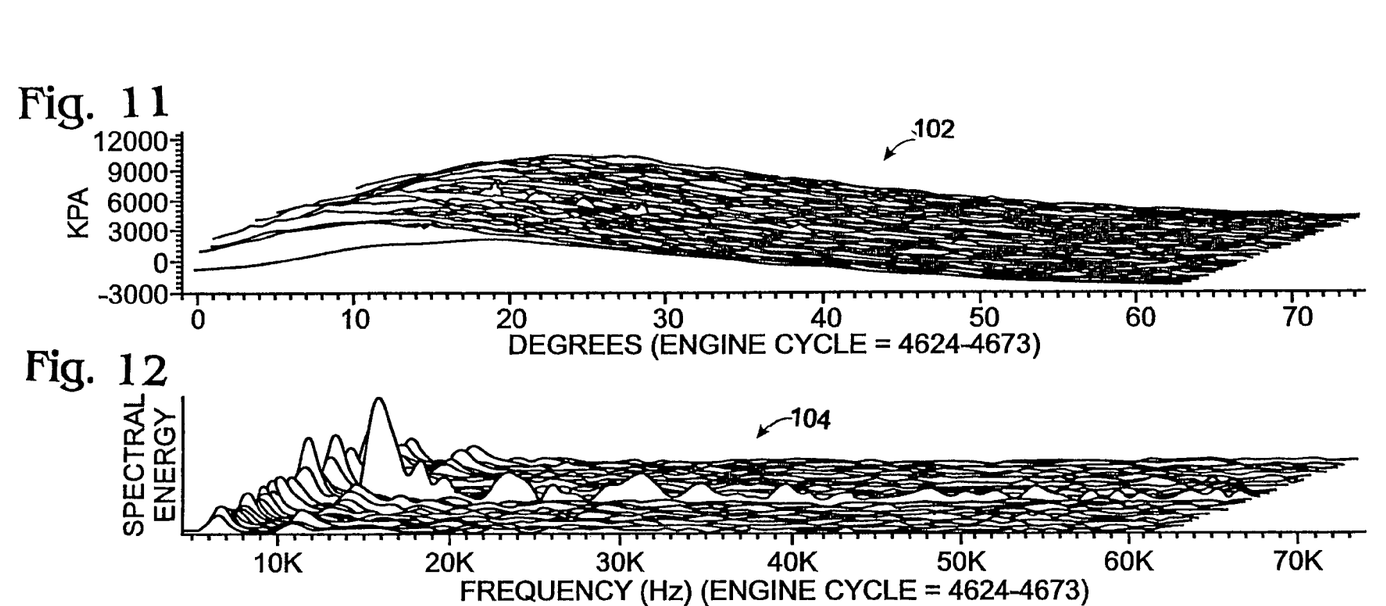
FIG. 11 is another waterfall-type display similar to the display presented in of FIG. 9, showing a somewhat larger collection of similar operating-cycle portions of a single-selected cylinder.
FIG. 12 is a frequency-domain spectral diagram, referred to herein as an energy-content spectral diagram, relating to the information pictured in FIG. 11, and specifically showing the energy levels of different spectral components contained in spectral data which has been transformed to the frequency domain from originally acquired, time-domain, engine-cylinder-operating data.

As a side note here, during a knock-assessment procedure, display 34 may be used to provide personnel conducting the procedure with waterfall-presented, per-cycle cylinder-pressure and frequency-domain plots like those shown, respectively, at 102, 104 in FIGS. 11 and 12, respectively.

As was mentioned earlier, spectral plot 96 may be looked at from two different points of view. In one of these, it may be viewed as representing a portion of the frequency content found in the windowed baseline collection of analogue input data for a single cylinder cycle. In the other, it may be treated as representing a portion of the frequency content of the other, post-baseline-window collection of analogue data which may provide evidence of knock behavior.

With respect to that view of plot 96 which relates it to baseline windowed data, and in accordance with certain summing and other calculations (not part of the present invention) performed regarding the two frequency-bin shaded areas of plot 96 as described in the above-referenced U.S. Patent, a noise-reduction index number, or value, is determined. This value is a cycle-specific value.

Concerning the other view of plot 96 which relates it to the other collection of gathered per-cycle data, i.e., that data which may contain evidence of cylinder-knock behavior, the same kinds of summing and other calculations are carried out to produce a "possible" noise-presence index number, or value. This value is also a cycle-specific value.

At the conclusion of these per-cycle index value determinations, the noise-reduction value is subtracted from the "possible" noise-presence value to leave a difference which is then compared to the previously mentioned noise-threshold value in order to determine whether a knock event has been detected. A difference exceeding the noise-threshold value indicates that, indeed, a knock event has occurred, and the engine-operating test span ends. A difference which is less than the noise-threshold value indicates that no knock event has occurred, and the testing process continues with a next-monitored cylinder cycle, respecting which the various operational steps expressed above are repeated.

Having thus generally described the overall operation of system 20, I focus now specifically on details of the dynamic baselining practice of the present invention. As this practice is shown in FIG. 5, the baselining practice of this invention can be viewed as including the several block-represented steps that are illustrated in this figure. Accordingly, what one sees here is a series of steps beginning with establishing an engine-operating test span (block 65A), operating the engine from the beginning of that test span in a knock-possible mode of operation (block 65B), collecting crank-angle cylinder operating-pressure data (block 65C) through the sub-practices of designating an appropriate crank angle window (sub-block 65C$_1$), and with respect to that window, gathering knock-free noise data (sub-block 65C$_2$). Next, the so-gathered data is treated as a created body (block 65D) of baseline noise-reduction data relevant to the particular cycle involved, which data is made available (block 65E) for subsequent processing and utilization in the above-described bin-summing spectral determination and assessment of the presence or absence of any engine-knock behavior in the relevant operating cycle.

From another perspective, and in accordance with the invention practice as illustrated in FIG. 6, this view of the practice begins with the steps previously mentioned regarding blocks 65A, 65B, followed by monitoring of the relevant input cycle-specific operating conditions (block 66A), then deriving (block 66B) an appropriately windowed part of that data (sub-block 66B$_1$), and ultimately applying that windowed data as noise-reduction information useful with respect to the balance portion of the relevant cycle wherein knock data may exist (block 66C).

Recalling that the operation of system 20, in terms of actual, ultimate, knock-behavior detection takes place in the realm of frequency-domain spectral data, it will be understood that, on a per-cycle basis, dynamic baselining noise-reduction data, analogue initially, is further processed in the manner generally illustrated in FIG. 7 in the drawings, and in particular with regard to the processing activities represented by blocks 68, 70, 72 in this figure. These three blocks in FIG. 7, in general terms, represent the steps of digitizing (block 68) the windowed, analogue baselining data, thereafter transforming (block 70) that data into frequency-domain spectral data, and following that, establishing, for each cycle, a body of digitized frequency-domain baselining data which will be employed directly for noise-reduction purposes as describe above.

Thus a novel, cycle-specific, dynamic noise-reduction methodology, in several forms, has been described for acquiring and using non-knock engine-noise data in real time, and while a subject engine is actually engaged in a normal-operating-mode knock-analysis procedure. This data is uniquely linked to an individual cylinder operating cycle, and may be acquired readily even in the presence of transient speed and load operating conditions.

Stating once again in several ways how to think about the novel methodology offered by the present invention, it can be expressed as being a real-time, dynamic, noise-reduction, per-cycle baselining method for use in the context of analyzing the engine-knock behavior of a selected cylinder in a subject internal combustion engine during an engine-operating test span, including the steps of (a) beginning with the first, and continuing with every subsequent, operating cycle of the selected cylinder during the test span, (1) monitoring cycle-specific cylinder-operating conditions, and (2), from such monitoring, deriving and applying, for noise-reduction purposes, to any cycle-specific engine-knock behavior detected during the process of monitoring, a cycle-specific body of baseline noise-reduction data (see FIG. 6).

From another point of view, the invention methodology may be seen as being a real-time, dynamic method for creating a body of cycle-and-cylinder-specific noise-reduction baseline data useable in conjunction with analyzing the engine-knock behavior of a subject internal combustion engine, including the steps of (a) operating the engine in an operating mode wherein engine knock may occur, and while doing so, and during each cycle of each cylinder, (b) gathering cycle-and-cylinder-specific, knock-free, engine-operating, baseline noise data which is intended and dedicated for noise-reduction use solely with respect to analyzing any knock data found to exist in the same operating cycle (see FIG. 5).

Still a further way of expressing the invention is to refer to it as being a dynamic, per-cylinder baselining method for facilitating noise reduction in the context of analyzing the engine-knock behavior of a subject internal combustion engine, including the steps of (a) operating the subject engine in a mode wherein engine knock in a cylinder is deemed possible to occur, and (b) while so operating, (1) collecting from that cylinder, and during each in a series of successive operating cycles regarding a selected cylinder, per-cycle, cylinder-crank-angle-related operating data, including both knock-containing and knock-free data, (2) from such collected cylinder-crank-angle-related knock-free operating data creating a body of noise-reduction-relevant baseline data, and thereafter (3) making the thus created baseline data body available to effect noise-reduction in the implementing of any subsequent analyses of crank-angle-related knock-containing data derived from the same operating cycle (see FIG. 5).

Accordingly, while the invention has been described in particular manners and in particular settings hereinabove, it is appreciated that variations from what has been discussed above may be made in the implementation of the invention, which variations will come within the scope of the following claims.

I claim:

1. A real-time, dynamic, noise-reduction, per-cycle baselining method for use in the context of analyzing the engine-knock behavior of a selected cylinder in a subject internal combustion engine during an engine-operating test span comprising beginning with the first, and continuing with every subsequent, operating cycle of the selected cylinder during the test span, (a) monitoring cycle-specific cylinder-operating conditions, and (b), from said monitoring, deriving and applying, for noise-reduction purposes, to any cycle-specific engine-knock behavior detected during said monitoring, a cycle-specific body of baseline noise-reduction data.

2. The method of claim 1, wherein, for each operating cycle of the selected cylinder, said deriving is based on a practice of crank-angle windowing which is defined for all operating cycles by windowing calculations that are performed during the mentioned first operating cycle.

3. The method of claim 1, wherein for each operating cycle of the selected cylinder, said deriving is based on a practice of crank-angle windowing which is defined independently for each such operating cycle by windowing calculations that are performed during that cycle.

4. The method of claim 1, wherein said monitoring, deriving and applying steps are performed within the engine-operating test span under circumstances with engine-speed transients introduced into the instantaneous operating speed of the engine.

5. A real-time, dynamic method for creating a body of cycle-and-cylinder-specific noise-reduction baseline data useable in conjunction with analyzing the engine-knock behavior of a subject internal combustion engine comprising operating the engine in an operating mode wherein engine knock may occur, and while doing so, and during each cycle of each cylinder, gathering cycle-and-cylinder-specific, knock-free, engine-operating, baseline noise data which is intended and dedicated for noise-reduction use solely with respect to analyzing any knock data found to exist in the same operating cycle.

6. The method of claim 5, wherein said operating includes introducing engine-operating-speed transients in the operating speed of the engine.

7. The method of claim 5, wherein, said gathering regarding each cycle is performed within a predefined crank-angle window which has pre-calculated boundaries that exist within the cycle.

8. The method of claim 7, wherein the pre-calculated boundaries of the mentioned crank-angle window are specific to, and calculated within, the cycle.

9. A dynamic, per-cylinder baselining method for facilitating noise reduction in the context of analyzing the engine-knock behavior of a subject internal combustion engine comprising operating the subject engine in a mode wherein engine knock in a cylinder is deemed possible to occur, and while so operating, (a) collecting from that cylinder, and during each in a series of successive operating cycles regarding a selected cylinder, per-cycle, cylinder-crank-angle-related operating data, including both knock-containing and knock-free data, (b) from such collected cylinder-crank-angle-related knock-free operating data creating a body of noise-reduction-relevant baseline data, and thereafter (c) making the thus created baseline data body available to effect noise-reduction in the implementing of any subsequent analyses of crank-angle-related knock-containing data derived from the same operating cycle.

10. The method of claim 9, wherein said collecting involves designating, for each relevant operating cycle, a crank-angle window which is associated with a knock-free portion of the cycle, and gathering the mentioned knock-free operating data solely from within that window.

11. The method of claim 10, wherein said designating is performed on the basis of predetermined, real-time, per-cycle, cylinder compression-peak criteria and information.

12. The method of claim 10, wherein an engine test span is initiated, and said designating is performed per cylinder during each operating cycle throughout the initiated test span.

13. The method of claim 10, wherein an engine test span is initiated, and said designating is performed per-cylinder once only during a cylinder operating cycle which is positioned early in the initiated test span.

14. The method of claim 13, wherein an engine test span is initiated, and said designating is performed per cylinder once only during the first cylinder operating cycle in the initiated test span.

* * * * *